United States Patent [19]
Wucherpfennig et al.

[11] 3,865,960
[45] Feb. 11, 1975

[54] STABILIZATION OF TARTAR IN WINE, GRAPE MUST, OR GRAPE JUICE

[76] Inventors: Karl Wucherpfennig, Riederbergstrasse 81, Wiesbaden; Guenter Wysocki, Hohenfriedbergerstrasse 36, Dortmund, both of Germany

[22] Filed: July 3, 1973

[21] Appl. No.: 376,230

[30] Foreign Application Priority Data
July 10, 1972   Germany............................ 2233821

[52] U.S. Cl................................. 426/239, 426/15
[51] Int. Cl................................................ C12g 1/00
[58] Field of Search ............ 426/15, 239, 330, 237, 426/478; 204/180 P

[56] References Cited
UNITED STATES PATENTS

| | | | |
|---|---|---|---|
| 3,165,415 | 1/1965 | Kilburn et al. | 426/239 |
| 3,437,491 | 4/1969 | Peterson et al. | 426/271 |
| 3,498,795 | 3/1970 | Walter | 426/330 |
| 3,687,682 | 8/1972 | Scheder | 204/180 P |

*Primary Examiner*—David M. Naff
*Attorney, Agent, or Firm*—Curtis, Morris & Safford

[57] ABSTRACT

A method for stabilizing tartar (i.e. inhibiting the precipitation of potassium bitartrate) in wine, grape must, or grape juice by electrodialyzing such liquids through membranes permeable to potassium and tartrate ions against a liquid whose osmotic pressure is substantially the same as that of the wine, must, or juice being electrodialyzed.

6 Claims, 1 Drawing Figure

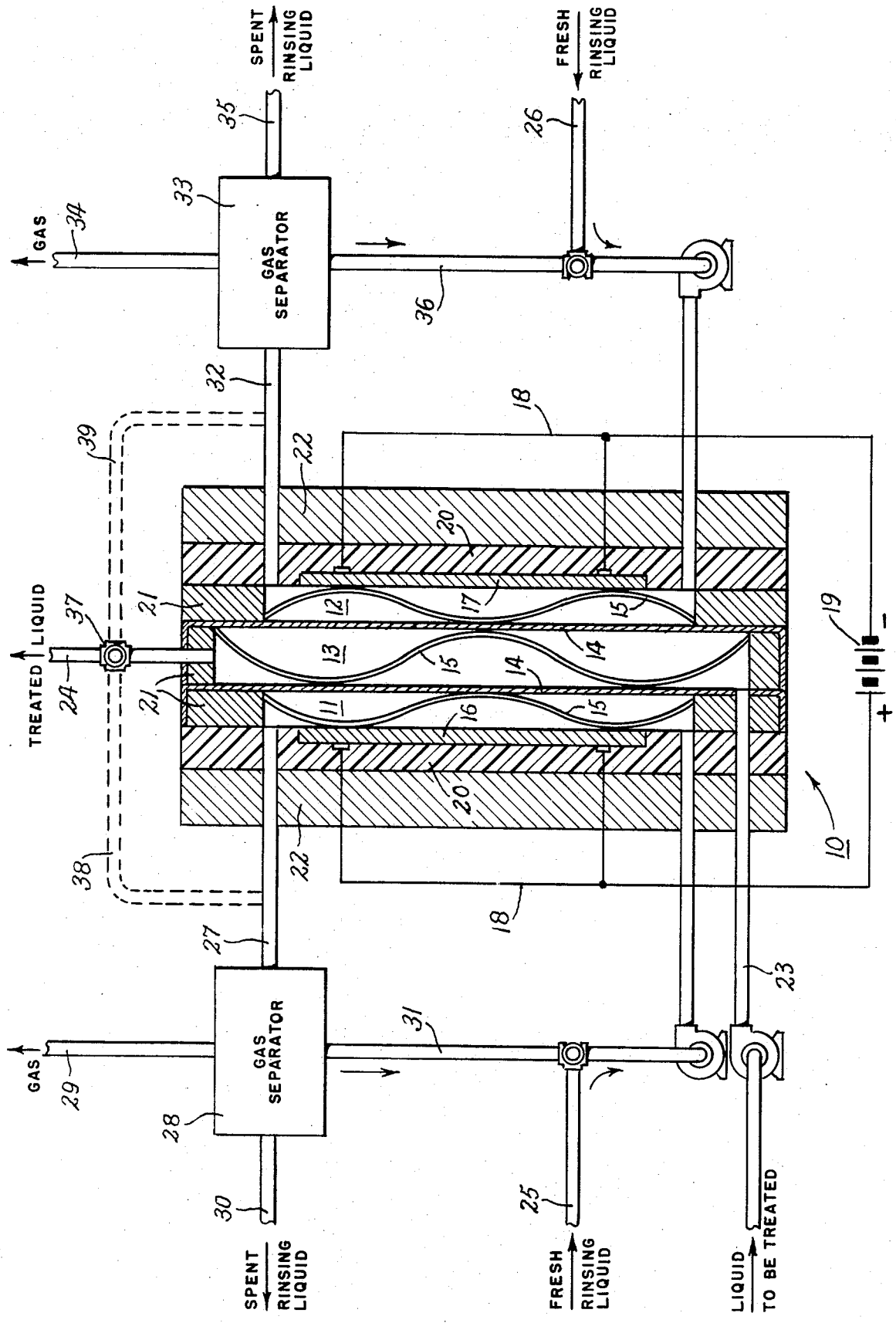

STABILIZATION OF TARTAR IN WINE, GRAPE MUST, OR GRAPE JUICE

METHOD FOR STABILIZING TARTAR IN WINE, GRAPE MUST, OR GRAPE JUICE

The present invention relates to a method for the stabilization of tartar in wine, grape must, or grape juice by electrodialyzing such liquids.

In wine, potassium bitartrate, also known as "tartar", precipitates in crystalline form during or after the fermentation of the grape must employed in making the wine.

Potassium and tartaric acid are present in the juice of ripe grapes. The separation of potassium bitartrate in wine is principally caused by the formation of ethanol during fermentation, since tartar is considerably less soluble in ethanol than in water. Also, the reduction in the temperature of the wine when it is stored in wine cellars, and the reduction of acidity in wine due to biological action also contribute to the separation of tartar. At the time of storage, the acidity of wine is generally below a pH of 3. When the acidity is reduced by biological action, raising the pH of the wine, the tartar becomes less soluble since its minimum solubility is at a pH value of 3. The tartar precipitates as it approaches the pH of minimum solubility. On the other hand, providing the wine has an initial pH below 3.5, its pH value is reduced by the precipitation of tartar. A variation in pH values may be the reason for the separation of tartar which is often observed when two wines, each of which alone does not separate tartar, are mixed.

Potassium bitartrate and calcium tartrate form slightly supersaturated solutions. The separation of these salts from wine may therefore take several months. This separation of tartar from the supersaturated solutions is undesirable, especially after the wine has been bottled for sale to the consumer. For aesthetic reasons the consumer tends to reject wines containing such precipitates, although the materials themselves are not physiologically harmful.

Sparkling wines are subjected to a second fermentation during which the resultant increase in ethanol content may again increase the instability (i.e. tendency toward precipitation) of the tartar dissolved therein. Since dissolved carbon dioxide may nucleate to form bubbles on the separated tartar crystals, an undesirable sudden release of gaseous carbon dioxide may occur upon opening of a bottle containing such crystals.

The same problems which have been discussed above in the case of wine and sparkling wine also occur with grape juice. Grape juice usually contains potassium and tartaric acid in such quantities that tartar will separate although, in the case of grape juice, this will take a longer period of time.

To satisfy the consumer demand for wines, sparkling wines, and grape juices which are free of crystalline precipitates, tartar-unstable beverages have previously been cooled in wine cellars to accelerate separation of the tartar. In general, the wine is cooled almost to its freezing point in an insulated cooling tank and stirred at this temperature for several days. To avoid the installation of refrigeration apparatus, the wine may also be cooled with dry ice by a process known as "tartar cold fining". In either case, such cooling remains an expensive procedure.

As already discussed, the alcohol content and pH value of such liquids, as well as their content of potassium, calcium, and tartaric acid, decisively influence the crystallization of tartar. Solution equilibrium curves have been plotted in scientific papers, from which it may be determined whether or not the liquid, e.g. wine, is tartar-stable. If, from a consideration of the aforementioned factors, it is ascertained that the wine is unstable, the wine must be cooled.

However, it is often found that wines will not precipitate any tartar despite protracted cooling. It can be concluded, therefore, that factors influence the separation of tartar other than those already mentioned.

It has been recommended in the art to agitate wine by stirring or by pump circulation if no tartar separates by cooling, or to inoculate the wine by the addition of tartar crystals. Nevertheless, despite such measures, it often happens that tartar still separates from the wine after bottling, i.e. that the wine is not tartar-stable.

Tests have shown that the delayed separation of tartar is mainly caused by polymeric and colloidal substances present in the wine, and that condensed polyphenols have a particularly inhibiting effect upon recrystallization. The cooling of wine to stabilize the tartar therein thus does not always lead to the desired result: it is an uncertain and expensive process.

Since it is known that polymeric substances delay or completely prevent the separation of tartar, it has been attempted in the prior art to stabilize wines against the recrystallization of tartar by the addition of polymeric substances. In 1956 it was proposed, for example, to add to wine small quantities of polymeric esters of tartaric acid which are obtained by heating tertaric acid to 170°C. The addition of these substances to wines, sparkling wines, and grape juices prevents the separation of tartar in most cases for about nine months. Other polymeric substances proposed for the addition of wine to delay tartar separation are gamboge and polymeric phosphates.

Further means of preventing the separation of tartar from tartar-unstable beverages involve removing the tartaric acid, the potassium ions, or both therefrom. One way of altering the concentration of tartaric acid involves precipitating it, for example by adding potassium compounds such as potassium carbonate. This effects precipitation and deacidizing as does the cellar storage technique. Further, it is known to add CaO, Ca(OH)$_2$, or calcium salts or organic acids to the wine.

The use of anion exchangers for the removal of tartaric acid is also known in the art. Since 1949, anion exchangers as well as CaCO$_3$ have been used in certain countries for de-acidizing wines. However, since the anion exchangers preferentially remove polybasic acids, phosphoric acid, sulfuric acid, and tartaric acid are principally removed from the wine.

At present, a practical reduction in the concentration of potassium ion present in wine can be effected only with cation exchangers. By treating wine with cation exchangers, potassium is removed from the wine more or less selectively. It is of no importance to the reduction of the potassium ion concentration whether potassium ion is replaced in this process by hydrogen ion or by another cation, for example sodium. There have been numerous publications in the art concerning the prevention of the separation of tartar by the removal of potassium ion with the aid of cation exchangers, and patents have been applied for and granted on such methods. In sum, the literature on the treatment of wines with cation exchangers shows that the separation of tartar may be reliably prevented in this manner and that still other improvements may be attained. In particular, the sparkling wine industry has converted on a large scale to making tartar-stable those wines to be used for the preparation of sparkling wines by treating them with ion exchangers.

Despite the simplicity and sureness of such a process, it has the great drawback that the wine comes into contact with substances whose non-toxicity and harmlessness from a nutritive-physiological point of view have not been definitively proved.

It is also possible that monomeric, oligomeric, or polymeric substances are transferred to the wine by such ion exchangers so that the consumer may, in certain cases, ingest substances which are not unobjectionable or may even be toxic from a nutritive-physiological viewpoint. This has caused certain countries to legislate the prohibition of the use of ion exchangers for the treatment of food and beverage products. The producers of wines and sparkling wines have thus often had to resort to the older processes described earlier herein, which are technically and economically unsatisfactory.

According to the present invention, it has been discovered that wine, grape must, and grape juice can be stabilized, i.e. the precipitation of tartar therefrom can be prevented, by subjecting the liquids to electrodialysis.

Electrodialysis has been employed heretofore in the art for the separation of salt from whey or to separate salt from sea water or other brackish waters. Further, electrodialysis may be used for the treatment of radioactivelycontaminated waste water of low specific activity and medium ion content. Electrodialysis has also been used for the recovery of dissolved catalysts from solution, for the treatment of diluted acids, for the purification of chemical and pharmaceutical products, and for the purification of certain by-products in the sugar industry.

According to the process of the present invention, the concentration of potassium and tartrate ions in wine, grape must, or grape juice can be altered, as it is in the case of treatment with ion exchangers, but without the objection that the wine is contacted with substances of questionable physiological effect.

An apparatus suitable for carrying out the process according to the present invention is shown in the accompanying drawing wherein the FIGURE shows electrodialysis apparatus 10 comprising anode compartment 11, cathode compartment 12, and dialysis compartment 13 separated one from another by semi-permeable membranes 14. Within compartments 11, 12 and 13, the membranes 14 are suitably spaced and supported by spacer elements 15 suitably made of a non-toxic material, for example a synthetic resinous material such as polyethylene, polypropylene, a polyamide, or the like.

Defining one wall of anode compartment 11 is anode 16; cathode 17 defines one wall of cathode compartment 12. The electrodes are contained within electrode support means 20, for example made of a non-toxic synthetic resin in which the electrodes are embedded. The electrodes themselves are suitably made of a non-toxic electrically conductive material, usually metal, for example from technically pure silver, from platinum, from platinum-plated titanium, or from platinum-plated stainless steel. The electrodes are connected by electrically conductive wiring 18 to direct current source 19.

Compartments 11 – 13 are further defined within the apparatus 10 by frame elements 21 which support the semipermeable membranes 14 at their edges. The frames are held together by pressure plates 22, which may be made of metal such as mild steel or stainless steel.

Wine to be treated according to the present invention is introduced into dialysis compartment 13 through line 23 containing pump means and emerges from dialysis compartment 13 through line 24. Fresh rinse fluid against which the wine is to be anodically electrodialyzed is introduced into anode compartment 11 through line 25, while the rinse liquid against which the wine to be treated is to be cathodically electrodialyzed is introduced into cathode compartment 12 through line 26.

Line 27 emerging from anode compartment 11 passes to gas separator 28 from which gas ($O_2$) generated at the anode is removed through line 29. By valve means not shown in the Figure, spent anodic rinse fluid can be removed from the gas separator in whole or in part through line 30 or can be introduced into line 31 in whole or in part for recycling into anode compartment 11.

Analogously, the cathodic rinse fluid emerging from cathode compartment 12 through line 32 passes into gas separator 33 wherein gas ($H_2$) generated at the cathode is removed through line 34. Again, the spent cathodic rinse liquid can be removed in whole or in part through line 35 or can be recycled in whole or in part to cathode compartment 12 through line 36.

Valve 37 permits treated liquid from dialysis compartment 13 to be recycled in whole or part to anode compartment 11 through line 38, in communication with lines 27 and 31, to be recycled in whole or part to cathode compartment 12 through line 39, in communication with lines 32 and 36, or to both of these compartments, if desired.

In carrying out the process of the invention in the apparatus shown in the FIGURE, when a direct current of suitable voltage is applied across electrodes 16, 17, potassium ions migrate through one of membranes 14 to cathode compartment 12 and the tartaric acid ion migrates through other membrane 14 to anode compartment 11. For economic and technical reasons, a voltage of from about 3.5 volts to about 9 volts is normally used. The amperage depends on the quantity of the potassium to be separated.

The liquids or rinsing solutions against which the wine, must, or juice are electrodialyzed remove the ions passing through membranes 14 and the gases (hydrogen and oxygen) formed at the electrodes. (The discharge potentials of hydrogen and hydroxide ions in the solutions are lower than those required to discharge potassium ion or the tartrate ion.

The wine, must, or juice being treated may be flowed continuously through dialysis chamber 13 of the apparatus shown in the FIGURE, as can the rinsing liquids passing through the anode and cathode compartments 11 and 12.

The voltage, current intensity, and liquid flow are regulated, if necessary after simple empirical testing, to reduce the concentration of potassium ion and tartrate ion in the wine being treated to such a degree that the wine can be considered as tartar-stabilized. It has proved appropriate to reduce the potassium content of the wine, grape must, or grape juice to an extent that potassium ion is present therein in an amount less than 450 mg per liter in wine, respectively 900 mg per liter in grape must or grape juice, when the tartrate ion is present in an amount between 1 - 4 grams per liter, its usual content in wine.

In a preferred embodiment of the invention, the rinsing liquids in the anode or cathode compartments 11, 12, have approximately the same osmotic pressure as that of the liquid being treated. For example, depending on source, the osmotic pressure of wine is generally between 35 and 55 atmospheres. Non-toxic liquids useful as rinsing solutions include aqueous solutions of ethanol, aqueous sugar solutions, and aqueous solutions of non-toxic salts such as sodium chloride. As discussed in greater detail hereinafter, wine, grape must, or grape juice itself can be used as the rinsing liquid in anode and cathode compartments 11 and 12. It is desirable to regulate the osmotic pressure of the liquids in the anode and cathode compartments to exclude the passage of water through the membranes. If there is a great difference in the osmotic pressures, special membranes allowing only the migration of anions and cations and excluding the passage of water may have to be employed to prevent excessive dilution of the wine. However, such membranes are expensive.

Those skilled in the art can easily adjust the osmotic pressure of the rinsing solution to suitable values. Thus, aqueous solutions of ethanol containing from about 60 to about 120 g per liter of ethanol generally match the range of osmotic pressures of the wines being treated. Similarly, aqueous solutions of sodium chloride containing from 40 to 80 g per liter of salt are suitable. Grape musts having a sugar content of 100 - 240 g per liter have osmotic pressures corresponding with those of aqueous solutions of invert sugar containing 120 - 240 g per liter.

As mentioned above, it has been found especially suitable to rinse anode compartment 11, cathode compartment 12, or both with the same type of liquid which is being electrodialyzed.

Indeed, by the use of different rinsing liquids in the anode and cathode compartments, particularly surprising and advantageous effects can be achieved.

Thus, if for example musts or wines produced from grapes from Southern countries having a low acid content are subjected to electrodialysis, the treated liquid emerging from dialysis chamber 13 in line 24 can be introduced as a rinsing liquid into anode compartment 11 through lines 38, 27, and 31 by means of valve 37, being circulated therethrough several times if desired. In this way, their total content of acid may be increased.

On the other hand, in another embodiment of the process, wine, must, or juice having a low potassium content may be subjected to electrodialysis and the liquid emerging from dialysis chamber 13 through line 24 may then be passed through lines 39, 32, and 36 by valve 37 to cathode compartment 12 as a rinsing liquid.

In a further embodiment of the invention, wines which are poor in tartaric acid content and which it is desirable to acidify may be introduced through line 25 and used as rinsing liquids in anode compartment 11. In cathode compartment 12, as usual, a liquid such as wine or must having an osmotic pressure comparable to the material being electrodialyzed is used as the rinse liquid. Since tartaric acid concentrates in anode compartment 11, the acid-poor material introduced thereinto is enriched by use as a rinsing liquid in this embodiment of the process.

In a still further embodiment of the invention, wines having a low potassium content can be enriched in potassium by introducing the wine through line 26 and using the wine as the rinsing liquid in cathode compartment 12. In this way, the acid content of the wine originally low in potassium can be reduced. Meanwhile, in anode compartment 11, a liquid of the same osmotic pressure as that of the liquid being electrodialyzed may be employed, as usual.

Thus, it will be evident that the present invention has many surprising and comprehensive advantages. First, a reduction in the concentration of potassium ion and of tartaric acid, as in the case of natural separation of tartar, can be effected to such a degree that there is no longer any separation of tartar, i.e. the treated materials are tartar-stable. Thus, the process effects an accelerated separation of tartar which can be carried out considerably more cheaply and more quickly than can the expensive and protracted cooling method.

In contrast to processes for the treatment of wines and musts with ion exchangers, the process of the invention has the further special advantage that the wines retain their natural taste. If, in treatment with ion exchangers, potassium is replaced by hydrogen ions, wines having an acid taste and which are unpalatable may be obtained. On the other hand, if potassium is replaced by sodium when using ion exchangers, wines are obtained having an unnaturally high content of sodium, which gives a product which has been completely changed from its natural composition. Indeed, wines treated with ion exchangers can be easily identified by analysis, especially when potassium has been replaced with sodium.

This is not true of the wines treated according to the present invention, since their composition after treatment corresponds to that which would be attained, for example, after the stabilization of tartar by cooling.

It could not have been foreseen that by electrodialytic treatment, i.e. by the removal of potassium or tartrate ions, stabilization of tartar could be effected in such a simple, safe, and quick manner. Further, the process has the surprising features that it can be varied in its different embodiments to increase or reduce the content of acid in other wines by using the other wines, having different potassium and acid contents, as rinsing fluids in the anode or cathode compartments, either with or without prior passage of such wines through electrodialysis chamber 13.

As membranes suitable for use in the present invention, non-toxic materials, suitably non-toxic polymeric synthetic resins, can be employed. Such materials may be polyolefins such as polyethylene or polypropylene, chlorinated polyolefins such as chlorinated polyethylene, polyamides (nylons), and polysaccharides such as cellulose acetate or cellulose ethyl ethers.

A better understanding of the present invention and of its many advantages will be had by referring to the following specific examples given by way of illustration.

EXAMPLE 1

In this Example, a wine whose original acidity, pH, content of tartaric acid, content of potassium ion, content of invert sugar, and content of ethyl alcohol are all characterized in Table I below, is passed through an electrodialysis apparatus of the type shown in the FIGURE comprising two semi-permeable membranes each having an area of 100 cm² and two electrodes of the same size, i.e. 100 cm². In the first instance, a direct current of 4.5 volts is applied to the electrodes at an amperage of 0.5 and 1 liter of wine per hour is passed through dialysis chamber 13. The following rinse liquids, which have the same or approximately the same osmotic pressure as the wine being treated, are passed through anode and cathode compartments 11, 12: (a) water; (b) a 10 percent aqueous solution of ethanol by volume; and (c) wine. The degree of removal of potassium ion and tartrate ion and the effect of the electrodialysis on the other properties of the wine is shown in Table I.

EXAMPLE 2

Example 1 is repeated except that grape must, rather than wine, is electrodialyzed successively using the following rinse liquids in both the anode and cathode compartments: (a) water; (b) an aqueous solution of 200 g per liter of invert sugar; and (c) grape must. Again, the results of the treatment are reported in Table I.

12, the dialyzed grape must has an acid content of 6.5 g per liter. It leaves cathode compartment 12 with its acid content reduced to 4.6 g per liter.

Wine treated in the same manner leaves dialysis chamber 13 with a concentration of 8.0 g per liter of acid and, after recirculation through cathode compartment 12, has an acid content of 6.1 g per liter.

EXAMPLE 5

With direct current of 4.5 volts applied to the electrodes of the device shown in the FIGURE at an amperage of 0.5, 1 liter of wine or must is passed per hour through dialysis chamber 13 of the apparatus. In cathode compartment 12, a liquid of the same osmotic pressure as the material being treated (for example wine or must) is used, while a wine or must which is poor in tartaric acid is passed through anode compartment 11. By this method, the wine or must poor in tartaric acid is enriched in anode compartment 11 by acid ions coming from the wine passing through dialysis chamber 13.

Thus, a grape must of a low acid content of 3.4 g per liter is enriched, by use as the rinse fluid in anode compartment 11, to an acid content of 5.3 g per liter.

Similarly, a wine of a low acid content of 2.9 g per liter is enriched, by use as a rinsing fluid in anode compartment 11, to an acid content of 4.8 g per liter.

TABLE I

| Property | | Wine (Ex 1) Rinse Liquid | | | Grape Must (Ex 2) Rinse Liquid | | |
|---|---|---|---|---|---|---|---|
| | | Water | 10% Et OH | Wine | Water | 10% Et OH | Grape Must |
| Total acid (g/l) | Before | 5.8 | 5.8 | 5.8 | 6.4 | 6.4 | 6.4 |
| | After | 5.8 | 5.8 | 5.8 | 6.4 | 6.4 | 6.4 |
| pH | Before | 3.35 | 3.35 | 3.35 | 3.5 | 3.5 | 3.5 |
| | After | 3.10 | 3.10 | 3.10 | 3.3 | 3.3 | 3.3 |
| Tartaric acid (g/l) | Before | 2.3 | 2.3 | 2.3 | 3.7 | 3.7 | 3.7 |
| | After | 2.0 | 2.0 | 2.0 | 2.7 | 2.7 | 2.7 |
| $K^-$ (mg/l) | Before | 943 | 943 | 943 | 1340 | 1340 | 1340 |
| | After | 477 | 477 | 477 | 780 | 780 | 780 |
| Invert sugar (g/l) | Before | 2.6 | 2.6 | 2.6 | 194 | 194 | 194 |
| | After | 2.1 | 2.2 | 2.6 | 189 | 194 | 194 |
| Ethyl alcohol (g/l) | Before | 83.1 | 83.1 | 83.1 | 0 | 0 | 0 |
| | After | 79.8 | 83.1 | 83.1 | 0 | 0 | 0 |

EXAMPLE 3

With a direct current of 4.5 volts applied to the electrodes at an amperage of 0.5, 1 liter of wine or grape must of low acid content is passed per hour through the dialysis chamber. In this embodiment, the treated wine or must emerging from dialysis chamber 13 is returned to anode compartment 11 as the rinse liquid. On entering the anode compartment, the grape must from the dialysis chamber has an acid concentration of 6.5 g per liter. After passage through the anode compartment, the acid content has been increased to 8.3 g per liter.

Wine subjected to the same process leaves dialysis chamber 13 with an acid content of 8.0 g per liter and, after recycling through anode compartment 11, has a content of 9.9 g per liter.

EXAMPLE 4

Example 3 is repeated except that the wine or grape must emerging from dialysis chamber 13 is passed through cathode compartment 12, rather than anode compartment 11, which results in a decrease in its acid content. Thus, when entering cathode compartment

EXAMPLE 6

Again using the apparatus shown in the FIGURE, a direct current of 4.5 volts is applied to the electrodes at an amperage of 0.5. 1 liter of wine or must is passed per hour through dialysis chamber 13. In this case, anode compartment 11 contains a rinse liquid of the same osmotic pressure, for example wine or must, as that of the material being dialyzed. However, a wine or must poor in potassium is passed through line 26 into cathode compartment 12 by which means the potassium-poor wine is enriched by potassium ions entering cathode compartment 12 from dialysis chamber 13.

Thus, the acidity of a grape must of a high acid content of 9.2 g per liter is reduced to 7.1 g per liter by passage through cathode compartment 12 and enrichment with potassium ions.

Using the same procedure, a wine having a high acid content of 8.7 g per liter is used as a rinse fluid in cathode compartment 12 and, by the introduction of potassium ions, has its acid content reduced to 6.8 g per liter.

These results are summarized in Table II below.

TABLE II

| Example | Material Treated | Initial Acidity (g/l) | Acidity on Leaving Anode Compartment | Acidity on Leaving Cathode Compartment |
|---|---|---|---|---|
| 3 and 4 | Dialyzed Grape Must | 6.5 | 8.3 | 4.6 |
| 5 | Dialyzed Wine | 8.0 | 9.9 | 6.1 |
|  | Low-Acid Grape Must | 3.4 | 5.3 | — |
|  | Low-Acid Wine | 2.9 | 4.8 | — |
| 6 | High-Acid Grape Must | 9.2 | — | 7.1 |
|  | High-Acid Wine | 8.7 | — | 6.8 |

What is claimed is:

1. A method for the stabilization of tartar in wine, grape must, or grape juice by the removal therefrom of sufficient potassium and tartrate ions to inhibit the precipitation of potassium bitartrate, which method comprises electrodialyzing said wine, must, or juice between an anode and a cathode through a first membrane permeable to potassium ions and a second membrane permeable to tartrate ions, in each case against a rinsing liquid present on the side of said membranes opposite said wine, must, or juice and having an osmotic pressure substantially equal to that of the wine, must, or juice being electrodialyzed, whereby potassium ions pass from the wine, must, or juice toward the cathode through said first membrane into rinsing liquid surrounding the cathode and tartrate ions pass from the wine, must, or juice through said second membrane toward the anode into rinsing liquid surrounding the anode.

2. A method as in claim 1 wherein said wine, must, or juice is electrodialyzed against wine, grape must, or grape juice.

3. A method as in claim 1 wherein the wine, must, or juice subjected to electrodialysis is, after such treatment, employed as the liquid against which further wine, must, or juice is anodically electrodialyzed.

4. A method as in claim 1 wherein the wine, must, or juice subjected to electrodialysis is, after such treatment, employed as the liquid against which further wine, must, or juice is cathodically electrodialyzed.

5. A method as in claim 1 wherein said wine, must, or juice are anodically electrodialyzed against wine or must poorer in acid content than the material being electrodialyzed.

6. A method as in claim 1 wherein said wine, must, or juice are cathodically electrodialyzed against a wine poorer in potassium ion content than the material being electrodialyzed.

* * * * *

UNITED STATES PATENT OFFICE
CERTIFICATE OF CORRECTION

PATENT NO. : 3,865,960
DATED : February 11, 1975
INVENTOR(S) : Wucherpfennig and Wysocki It is certified that error appears in the above-identified patent and that said Letters Patent are hereby corrected as shown below:

In Item [30] of the Heading, the number "2233821" should read -- 2233812 --.

Signed and sealed this 6th day of May 1975.

(SEAL)
Attest:

RUTH C. MASON
Attesting Officer

C. MARSHALL DANN
Commissioner of Patents
and Trademarks